(12) United States Patent
Na

(10) Patent No.: US 10,420,115 B2
(45) Date of Patent: Sep. 17, 2019

(54) BASE STATION APPARATUS, AND METHOD AND SYSTEM FOR CONTROLLING FULL-DUPLEX TRANSMISSION

(71) Applicant: SK TELECOM CO., LTD., Seoul (KR)

(72) Inventor: Min Soo Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/573,743

(22) PCT Filed: Mar. 7, 2016

(86) PCT No.: PCT/KR2016/002241
§ 371 (c)(1),
(2) Date: Nov. 13, 2017

(87) PCT Pub. No.: WO2016/182182
PCT Pub. Date: Nov. 17, 2016

(65) Prior Publication Data
US 2018/0213538 A1 Jul. 26, 2018

(30) Foreign Application Priority Data

May 14, 2015 (KR) .................. 10-2015-0067030

(51) Int. Cl.
*H04W 72/08* (2009.01)
*H04B 7/26* (2006.01)
(Continued)

(52) U.S. Cl.
CPC ............ *H04W 72/082* (2013.01); *H04B 7/26* (2013.01); *H04B 15/02* (2013.01); *H04B 17/11* (2015.01);
(Continued)

(58) Field of Classification Search
CPC .... H04L 5/14; H04L 1/0026; H04W 72/1231; H04W 72/082; H04W 72/04;
(Continued)

(56) References Cited

U.S. PATENT DOCUMENTS

2013/0194984 A1 8/2013 Cheng et al.
2015/0049624 A1 2/2015 Sun et al.
(Continued)

FOREIGN PATENT DOCUMENTS

EP 2040503 A1 3/2009

OTHER PUBLICATIONS

International Search Report dated Jun. 23, 2016 corresponding to International Application No. PCT/KR2016/002241.

*Primary Examiner* — Paul H Masur
*Assistant Examiner* — Michael K Phillips
(74) *Attorney, Agent, or Firm* — Hauptman Ham, LLP

(57) ABSTRACT

A Base Station (BS) device includes: a signal reception quality value identification unit configured to identify, at every preset identification period, a signal reception quality value in an uplink interference-free environment measured for each terminal in a part of radio resource of Full Duplex (FD) transmission radio resources for transmitting only downlink signals; a terminal identification unit configured to identify a particular terminal experiencing uplink interference due to Full Duplex (FD) transmission among terminals using the FD transmission when a value of the uplink interference caused to the particular terminal is larger than or equal to a preset threshold value; a selection unit configured to select an interfering terminal that causes the uplink interference to the particular terminal; and a controller configured to control the FD transmission radio resources allocated to the interfering terminal to reduce the uplink interference which caused to the particular terminal.

16 Claims, 6 Drawing Sheets

(51) Int. Cl.
- *H04B 15/02* (2006.01)
- *H04B 17/11* (2015.01)
- *H04B 17/24* (2015.01)
- *H04B 17/345* (2015.01)
- *H04L 5/14* (2006.01)
- *H04W 72/04* (2009.01)
- *H04W 52/24* (2009.01)
- *H04W 88/08* (2009.01)
- *H04W 52/14* (2009.01)
- *H04W 52/38* (2009.01)
- *H04W 52/44* (2009.01)

(52) U.S. Cl.
CPC ........... *H04B 17/24* (2015.01); *H04B 17/345* (2015.01); *H04L 5/14* (2013.01); *H04W 52/243* (2013.01); *H04W 52/247* (2013.01); *H04W 72/0413* (2013.01); *H04W 52/146* (2013.01); *H04W 52/241* (2013.01); *H04W 52/386* (2013.01); *H04W 52/44* (2013.01); *H04W 88/08* (2013.01)

(58) Field of Classification Search
CPC ......... H04W 72/1226; H04W 72/1278; H04W 72/0413; H04W 52/243; H04W 52/247; H04W 88/08; H04W 52/146; H04W 52/241; H04W 52/386; H04W 52/44; H04B 7/26; H04B 15/02; H04B 17/11; H04B 17/24; H04B 17/345
See application file for complete search history.

(56) References Cited

U.S. PATENT DOCUMENTS

| | | |
|---|---|---|
| 2015/0078177 A1 | 3/2015 | Buckley et al. |
| 2015/0078212 A1 | 3/2015 | Buckley et al. |
| 2016/0044689 A1* | 2/2016 | Wen .................... H04J 11/0023 370/330 |
| 2017/0064721 A1* | 3/2017 | Noh .................... H04W 72/082 |
| 2017/0245160 A1* | 8/2017 | Rost .................... H04W 16/24 |
| 2017/0273091 A1* | 9/2017 | Noh .................... H04W 72/082 |

* cited by examiner

BASE STATION APPARATUS, AND METHOD AND SYSTEM FOR CONTROLLING FULL-DUPLEX TRANSMISSION

CROSS REFERENCE TO RELATED APPLICATION

This application claims the priority of Korean Patent Application No. 10-2015-0067030 filed on May 14, 2015, in the Korean Intellectual Property Office, the disclosure of which is incorporated herein by reference. Further, this application is the National Phase application of International Application No. PCT/KR2016/002241 filed Mar. 7, 2016, which designates the United States.

BACKGROUND OF THE INVENTION

1. Field of the Invention

The present disclosure relates to a Base Station (BS) device, and a method and a system for controlling full-duplex (FD) transmission that is capable of resolving additional interference generated due to FD transmission when FD transmission is used in an actual mobile communication environment including a plurality of terminals.

2. Description of the Prior Art

Recently, the demand for wireless traffic has continuously increased due to the development of wireless communication technology. Various technologies are emerging in order to meet the increasing demand for wireless traffic.

As one of the technologies, a Full-Duplex (FD) transmission technology, which is capable of performing transmission and reception using one frequency/time resource in two nodes, has attracted attention.

In the case of Half-Duplex (HD) transmission, each node uses frequency and/or time resources separately for transmission and reception. In the case of FD transmission, however, two nodes use the same frequency/time resource at the same time for transmission and reception.

At this time, in the case of FD transmission, since transmission and reception are simultaneously performed through the same frequency/time resource, the signal transmitted by the node itself acts as interference (hereinafter, "self-interference") when a signal transmitted from a counterpart node is received. In this case, at the node side, since the signal transmitted by the node itself is already known, the self-interference due to the transmission signal at the time of signal reception can be eliminated by eliminating interference in an analog domain/a digital domain.

Due to this, when the self-interference is completely eliminated in the FD transmission, there is an advantage of acquiring a resource usage rate up to 2 times higher than that of HD transmission, from the perspective of both nodes.

However, when FD transmission is applied to (used in) an actual communication environment including a plurality of terminals, additional uplink interference for a terminal, which is caused by another terminal (hereinafter, referred to as a "same cell terminal") located within a cell of the same BS, is generated at the time of downlink.

In addition, when the FD transmission is applied to (used in) an actual communication environment having a plurality of terminals, additional uplink interference for a terminal, which is caused by another terminal (hereinafter, referred to as a "different cell terminal") located within a cell of a different BS, is generated at the time of downlink.

Since the uplink interference (hereinafter, referred to as "additional interference by the FD") causes a reduction in transmission capacity, FD transmission can be less effective than HD transmission with respect to total transmission capacity even though the transmission capacity is increased by increasing the resource utilization rate up to two times due to FD transmission.

Thus, the present disclosure provides a method of solving the additional interference due to FD transmission when the FD is used in an actual mobile communication environment including a plurality of terminals.

SUMMARY OF THE INVENTION

An aspect of the present disclosure is to provide a BS device, and a method and a system for controlling full-duplex transmission that is capable of resolving additional interference generated due to FD transmission when FD transmission is used in an actual mobile communication environment including a plurality of terminals.

In accordance with an aspect of the present disclosure, a Base Station (BS) device is provided. The BS device includes: a terminal identification unit configured to identify a particular terminal experiencing uplink interference due to Full Duplex (FD) transmission larger than or equal to a preset threshold value among terminals using the FD transmission; a selection unit configured to select an interfering terminal that causes the uplink interference in the particular terminal; and a controller configured to control FD transmission radio resources allocated to the interfering terminal to reduce the uplink interference experienced by the particular terminal.

Specifically, the BS device may further include an interference identification unit configured to identify the uplink interference experienced by each terminal due to the FD transmission, wherein the terminal identification unit may identify a terminal experiencing identified uplink interference larger than or equal to the threshold value as the particular terminal among the terminals.

Specifically, when there is a terminal reporting self-determination information indicating that the uplink interference due to FD transmission is larger than or equal to the threshold value, among the terminals, the terminal identification unit may identify the terminal reporting the self-determination information as the particular terminal.

Specifically, the BS device may further include a signal reception quality value identification unit configured to identify a signal reception quality value in an uplink interference-free environment (non-interference) measured for each terminal in a part of radio resources for transmitting only downlink signals among FD transmission radio resources.

Specifically, the interference identification unit may collect the signal reception quality value in the FD transmission environment measured for each terminal in the FD transmission radio resources, and identify the uplink interference for each terminal based on the signal reception quality value in an FD transmission environment and the signal reception quality value in the uplink interference-free environment.

Specifically, the part of radio resources may be a part of a channel bandwidth of the FD transmission radio resources for transmitting only downlink signals at every preset identification period or a part of a plurality of sub-carriers that separate the channel bandwidth of the FD transmission radio resources at certain intervals.

Specifically, the interfering terminal may be a terminal selected according to a distance from the particular terminal among terminals connected to the BS device or a neighboring BS adjacent to the BS device.

Preferably, the controller may down-control an uplink transmission strength of the interfering terminal or blanking-control uplink of the interfering terminal in FD transmission radio resources allocated to the interfering terminal.

Specifically, the controller may down-control an uplink transmission strength of the interfering terminal in FD transmission radio resources allocated to the interfering terminal, and when the uplink interference of the particular terminal is larger than or equal to the threshold value after the uplink transmission strength of the interfering terminal is down-controlled, blanking-control uplink of the interfering terminal.

In accordance with another aspect of the present disclosure, a method of controlling FD transmission is provided. The method includes: a terminal identification step of identifying a particular terminal experiencing uplink interference due to FD transmission larger than or equal to a preset threshold value among terminals using the FD transmission by a BS; a selection step of selecting an interfering terminal that causes the uplink interference in the particular terminal by the BS; and a control step of controlling FD transmission radio resources allocated to the interfering terminal to reduce the uplink interference experienced by the particular terminal by the BS.

Specifically, the method may further include an interference identification step of identifying the uplink interference experienced by each terminal due to FD transmission by the BS, wherein the terminal identification step may include identifying a terminal experiencing identified uplink interference larger than or equal to the threshold value as the particular terminal among the terminals.

Specifically, the method may further include a step of reporting self-determination information to the BS by a terminal that determines that the uplink interference due to FD transmission is larger than or equal to the threshold value among the terminals, wherein the terminal identification step may include identifying the terminal reporting the self-determination information as the particular terminal among the terminals.

Specifically, the method may further include a step of identifying a signal reception quality value in an uplink interference-free environment measured for each terminal in some radio resources for transmitting only downlink signals among FD transmission radio resources by the BS.

Specifically, the interference identification step may include: collecting the signal reception quality value in the FD transmission environment measured for each terminal in the FD transmission radio resources; and identifying the uplink interference for each terminal based on the signal reception quality value in the FD transmission environment and the signal reception quality value in an interference-free environment.

Specifically, the control step may include down-controlling an uplink transmission strength of the interfering terminal or blanking-controlling uplink of the interfering terminal in FD transmission radio resources allocated to the interfering terminal.

Specifically, the control step may include down-controlling an uplink transmission strength of the interfering terminal in FD transmission radio resources allocated to the interfering terminal, and when the uplink interference of the particular terminal is larger than or equal to the threshold value even the uplink transmission strength of the interfering terminal is down-controlled, blanking-controlling uplink of the interfering terminal.

In accordance with another aspect of the present disclosure, a method of controlling FD transmission is provided. The method includes: identifying uplink interference due to FD transmission by a terminal; reporting self-determination information to a BS by the terminal when it is determined that the uplink interference is larger than or equal to a preset threshold; and selecting an interfering terminal that causes the uplink interference to the terminal reporting the self-determination information and controlling FD radio resources allocated to the interfering terminal to reduce the uplink interference experienced by the terminal by the BS.

In accordance with another aspect of the present disclosure, a system for controlling FD transmission is provided. The system includes: at least one terminal, configured to identify a signal reception quality value in an uplink interference-free environment generated by measuring a downlink signal of a BS in a part of radio resources for transmitting only the downlink signal among FD transmission radio resources and a signal reception quality value in the FD transmission environment generated by measuring the downlink signal of the BS in the FD transmission radio resources; and the BS, configured to, when a particular terminal experiencing uplink interference due to FD transmission larger than or equal to a preset threshold value is identified among the at least one terminal based on the signal reception quality value in the uplink interference-free environment and the signal reception quality value in the FD transmission environment related to the at least one terminal, select an interfering terminal that causes the uplink interference in the particular terminal and then control FD transmission radio resources allocated to the interfering terminal to reduce the uplink interference experienced by the particular terminal.

According to a BS device and a method and a system for controlling FD transmission according to the present disclosure, it is possible to accomplish an effect of resolving additional interference generated due to FD when the FD is used in an actual mobile communication environment including a plurality of terminals.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings.

Figure 1:
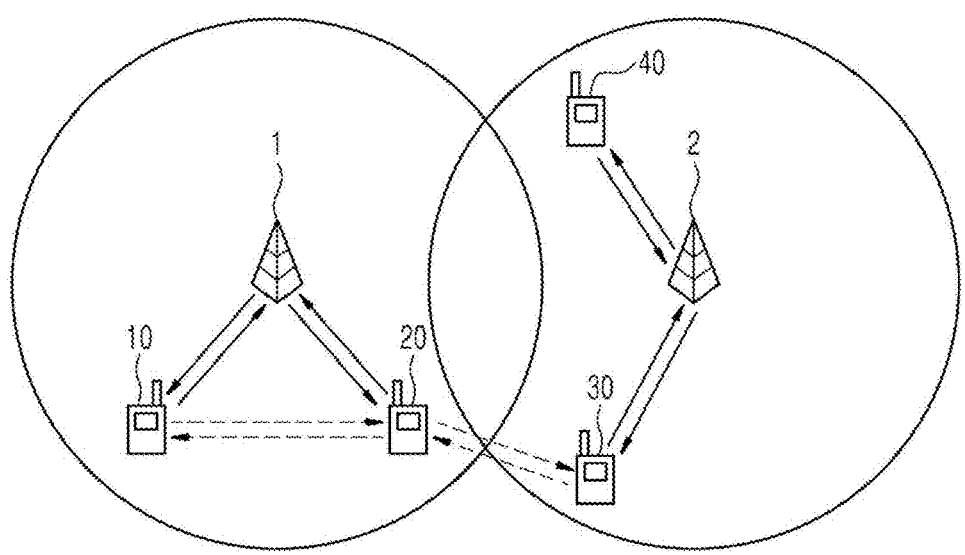
FIG. 1 illustrates a system for controlling FD transmission according to an embodiment of the present disclosure in a mobile communication environment in which additional interference due to FD transmission is generated.

FIG. 1 illustrates a full-duplex transmission control system according to an embodiment of the present disclosure in a mobile communication environment to which the present disclosure is applied.

At this time, although FIG. 1 illustrates two Base Stations (BSs) and the case where two terminals is connected to each of the two BSs, this is only an embodiment for convenience of description, and the present disclosure can be applied to a mobile communication environment in which a larger number of BSs and a plurality of terminals exist.

The terminals illustrated in FIG. 1 collectively refer to a mobile or fixed user node such as a User Equipment (UE) or a Mobile Station (MS).

The BSs illustrated in FIG. 1 collectively refer to a network node, such as a NodeB, an eNodeB, a base station, or an access point, that communicates with the terminal.

In Half-Duplex technology, each node uses frequency and/or time resources separately for transmission and reception.

For example, the case where the HD is applied (used) will be described below based on the assumption that only the terminal 10 is connected to the BS 1 and only the terminal 30 is connected to the BS 2 in the mobile communication environment illustrated in FIG. 1.

When the HD is applied (used), frequency and/or time resources are divided into downlink and uplink resources. Signals transmitted by a BS 1 and a BS 2 are respectively received by the terminal 10 and the terminal 30 through the downlink resources, and signals transmitted by the terminal 10 and the terminal 30 are respectively received by the BS 1 and the BS 2 through the uplink resources.

In contrast, in the FD technology, respective nodes simultaneously use the same frequency/time resources for transmission and reception.

For example, the case where the FD is applied (used) will be described below based on the assumption that only the terminal 10 is connected to the BS 1 and only the terminal 30 is connected to the BS 2 in the mobile communication environment illustrated in FIG. 1.

When the FD is applied (used), the BS 1 and the terminal 10 simultaneously use the same frequency/time resources to transmit and receive signals to and from each other, and the BS 2 and the terminal 30 simultaneously use the same frequency/time resources to transmit and receive signals to and from each other.

At this time, in the case of FD, since transmission and reception are simultaneously performed through the same frequency/time resources, a signal transmitted by a node (BS or terminal) acts as interference (self-interference) when the node receives a signal from a counterpart node (terminal or BS). At this time, the node (BS or terminal) already knows the signal transmitted by itself, and thus may remove the self-interference due to the transmitted signal through interference cancellation in an analog domain/a digital domain when receiving the signal.

Accordingly, when the self-interference cancellation is complete, the FD has advantages of guaranteeing a resource utilization rate up to twice that of HD for mutually connected nodes (BS and terminal).

However, when the FD is applied to (used for) the actual mobile communication environment in which a plurality of terminals is connected to one BS, the terminal additionally experiences uplink interference caused by a terminal located within a cell of the same BS (hereinafter, referred to as a "same-cell terminal") and uplink interference caused by a terminal located within a cell of a different BS (hereinafter, referred to as a "different-cell terminal") in the case of downlink.

For example, the following description will be made based on an assumption that the terminals 10 and 20 are connected to the BS 1 and the terminals 30 and 40 are connected to the BS 2 in the mobile communication environment illustrated in FIG. 1. When the FD is applied (used), the terminal 10 additionally experiences uplink interference (dotted line) caused by the terminal 20 located within the cell of the BS 1, which is the same as the BS of the terminal 10, and the terminal 20 additionally experiences uplink interference (dotted line) caused by the terminal 10 located within the cell of the BS 1, which is the same as the BS of the terminal 20 in the case of the downlink.

Further, the following description will be made based on the assumption that the terminals 10 and 20 are connected to the BS 1 and the terminals 30 and 40 are connected to the BS 2 in the mobile communication environment illustrated in FIG. 1. When the FD is applied (used), the terminal 20 additionally experiences uplink interference (dotted line) caused by the terminal 30 located within a cell of the BS 2 which is different from the BS 1, and the terminal 30 additionally experiences uplink interference (dotted line) caused by the terminal 20 located within the cell of the BS 1 which is different from the BS 2 in the case of downlink.

As described above, since the uplink interference (hereinafter, referred to as additional interference due to FD) by same-cell terminals and different-cell terminals in the downlink causes deterioration of transmission capacities, FD transmission can be less effective than HD transmission with respect to total transmission capacity by the additional interference due to FD even though the transmission capacity is increased by increasing the resource utilization rate up to two times due to FD transmission.

Accordingly, the present disclosure proposes a method of resolving the additional interference due to FD when FD is used in an actual mobile communication environment including a plurality of terminals, as illustrated in FIG. 1.

The following description will be made based on the BS 1, among the BS 1 and the BS 2. A system for controlling FD transmission according to the present disclosure includes at least one terminal, that is, the terminals 10 and 20 and the BS 1. At least one terminal, that is, the terminals 10 and 20 have a signal reception quality value in the uplink interference-free environment and a signal reception quality value in the FD transmission environment, and the BS 1.

Here, at least one terminal, that is, the terminals 10 and 20, is a terminal having a signal reception quality value in the uplink interference-free environment generated by measuring a downlink signal of the BS 1 in some radio resources for transmitting only the downlink signal among FD transmission radio resources and a signal reception quality value in the FD transmission environment generated by measuring a downlink signal of the BS 1 in the FD transmission radio resources.

Further, when a particular terminal (for example, the terminal 20) experiencing uplink interference due to the FD transmission higher than or equal to a preset threshold value is identified between the terminals 10 and 20 based on the signal reception quality value in the uplink interference-free environment and the signal reception quality value in the FD transmission environment related to at least one terminal, that is, the terminals 10 and 20, the BS 1 is a BS that selects an interfering terminal, which causes the uplink interference in the particular terminal (for example, the terminal 20), and then controls FD transmission radio resources allocated to the interfering terminal to reduce the uplink interference that influences the particular terminal (for example, the terminal 20).

Hereinafter, a BS device according to an embodiment for implementing the method proposed by the present disclosure will be described with reference to FIG. 2.

Figure 2:
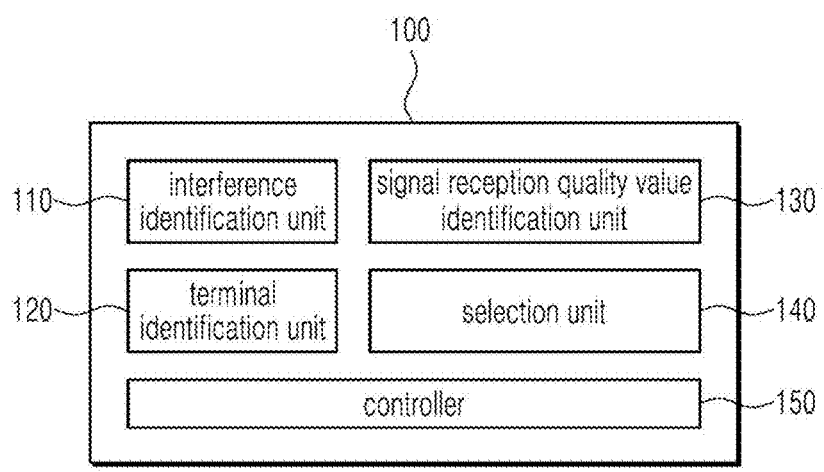
FIG. 2 is a block diagram illustrating the detailed configuration of a BS device according to an embodiment of the present disclosure.

As illustrated in FIG. 2, a BS device 100 according to an embodiment of the present disclosure includes a terminal identification unit 120 for identifying a particular terminal experiencing uplink interference due to FD transmission higher than or equal to a preset threshold value among terminals using the FD transmission, a selection unit 140 for selecting an interfering terminal that causes the uplink interference in the particular terminal, and a controller 150 for controlling FD transmission radio resources allocated to the interfering terminal to reduce the uplink interference that influences the particular terminal.

Here, the BS device 100 according to the present disclosure may be one of the BSs located in the mobile communication environment illustrated in FIG. 1.

Hereinafter, for the convenience of description, it is assumed that the BS device 100 according to the present disclosure is the BS 1 of FIG. 1.

Further, the BS device 100 according to the present disclosure may have a self-interference cancellation function for FD transmission, and the terminals illustrated in FIG. 1 may also have the self-interference cancellation function for FD transmission.

The terminal identification unit 120 identifies a particular terminal experiencing uplink interference due to FD transmission higher than or equal to a preset threshold value among the terminals using FD transmission.

At this time, according to an embodiment in which the particular terminal is identified, the BS device 100 according to the present disclosure may further include an interference identification unit 110 and a signal reception quality value identification unit 130, as illustrated in FIG. 2.

Hereinafter, an embodiment in which the BS device 100 according to the present disclosure includes the interference identification unit 110 and the signal reception quality value identification unit 130 will be described in detail.

The interference identification unit 110 identifies uplink interference due to FD transmission for each terminal using FD transmission.

At this time, based on the assumption that the BS device 100 according to the present disclosure is the BS 1 of FIG. 1, as in the above-described example, the interference identification unit 110 may identify uplink interference due to FD for each of the terminals 10 and 20 using FD, the terminals 10 and 20 being connected to the BS device 100.

As described above, the uplink interference due to FD is additional interference that the terminal receives from same-cell terminals and different-cell terminals in the downlink link as FD is used. Hereinafter, for convenience of description, the expressions "uplink interference due to FD" and "additional interference due to FD" will be considered to the same meaning and to thus be interchangeable.

The interference identification unit 110 identifies the uplink interference due to FD, that is, the additional interference due to FD for each of the terminals 10 and 20 using FD.

A process of identifying the uplink interference due to FD, that is, the additional interference due to FD for each of the terminals 10 and 20 using FD, is described below in detail.

First, the BS device 100 may set a threshold value (a) related to the uplink interference due to FD and an identification period (T) for identifying the signal reception quality value in the uplink interference-free environment described below.

Further, the BS device 100 includes the signal reception quality value identification unit 130 as an element for identifying the signal reception quality value in the uplink interference-free environment.

The signal reception quality value identification unit 130 identifies the signal reception quality value in the uplink interference-free environment measured for each terminal in some radio resources for transmitting only a downlink signal among FD transmission radio resources.

At this time, some radio resources may be the part of a channel bandwidth of the FD transmission radio resources for transmitting only the downlink signal at every preset identification period (T) or part of a plurality of sub-carriers that separate the channel bandwidth of the FD transmission radio resources at certain intervals.

A detailed description thereof will be made with reference to FIG. 3. The BS device 100 according to the present disclosure may allocate only downlink resources without allocating uplink resources in the channel bandwidth of the FD radio resources for a predetermined time (t) at every preset identification period (T) among the FD transmission radio resources (hereinafter, referred to as FD radio resources) that simultaneously use the same frequency/time resources for transmission and reception, as illustrated in a first embodiment of FIG. 3.

Here, the channel bandwidth of the FD radio resources in which only the downlink resources are allocated at every preset identification period (T) corresponds to some radio resources for transmitting only the downlink signal among the FD radio resources.

Meanwhile, the BS device 100 divides the channel bandwidth of the FD radio resources into a plurality of subcarriers having certain intervals for a predetermined time (t) at every preset identification period (T) and allocates only downlink resources without allocating uplink resources in some (for example, N) of the plurality of subcarriers dividing the channel bandwidth.

Here, some (for example, N) sub-carriers of the channel bandwidth of the FD radio resources to which only the downlink resources are allocated at every preset identification period (T) correspond to some radio resources for transmitting only the downlink signal among the FD radio resources.

Further, the BS device 100 informs each of the terminals 10 and 20 of the above-described identification period (T) and allows each of the terminals 10 and 20 to measure an SINR (b) in the uplink interference-free environment described below at every identification period (T).

In the case of the first embodiment and the second embodiment, since there is no uplink signal in some radio resources in which there is no uplink interference, that is, additional interference due to FD caused by same-cell terminals and different-cell terminals, each of the terminals 10 and 20 connected to the BS device 100 may measure a signal reception quality value (for example, SINR) based on a downlink signal from the BS device 100 and report the measured signal reception quality value to the BS device 100.

Hereinafter, for convenience of description, the signal reception quality value (for example, SINR) measured and reported for each of the terminals 10 and 20 in some radio resources in which there is no additional interference due to FD among the FD radio resources will be referred to as an SINR (b) in the uplink interference-free environment.

Accordingly, the signal reception quality value identification unit 130 may periodically identify the SINR (b) in the uplink interference-free environment for each of the terminals 10 and 20 by receiving the report on the SINR (b) in the uplink interference-free environment measured for each of the terminals 10 and 20 in some radio resources in which there is no additional interference due to FD among the FD radio resources at every identification period (T).

Meanwhile, the interference identification unit 110 collects signal reception quality values in the FD transmission environment measured for each of the terminals 10 and 20 in the FD radio resources.

Figure 3:
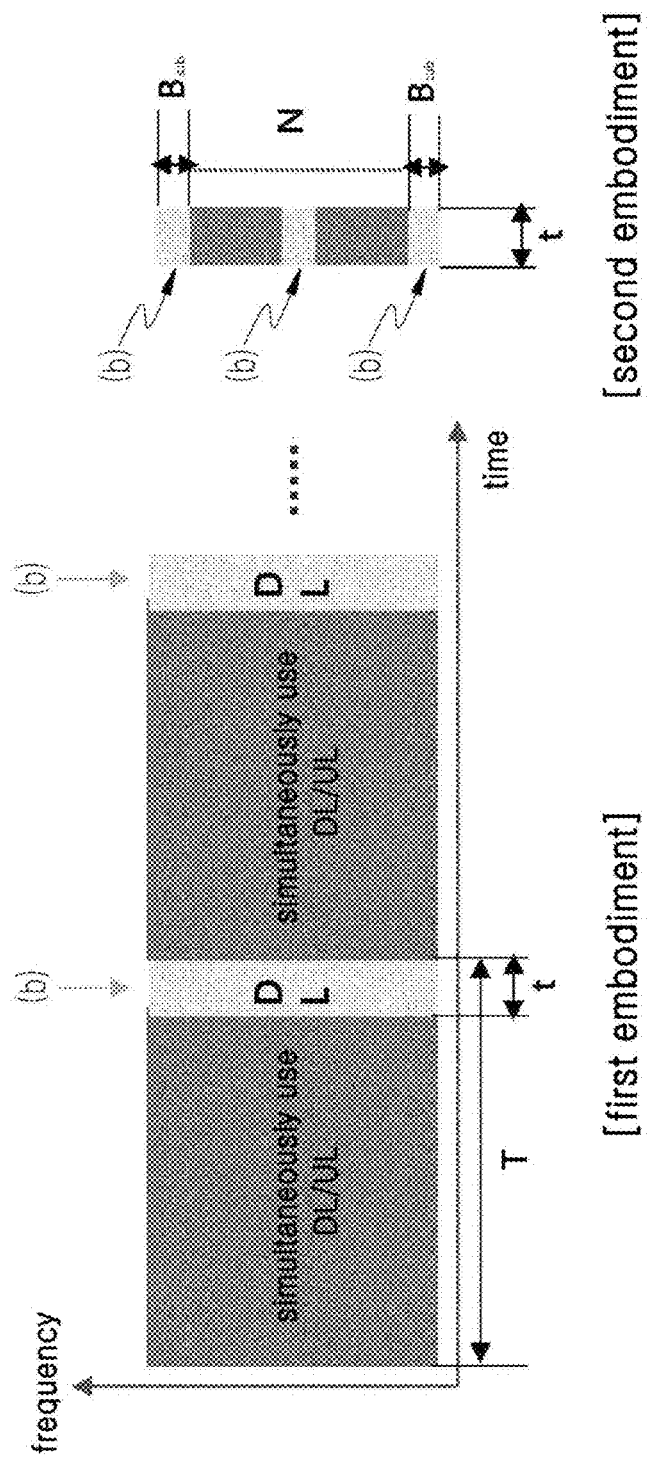
FIG. 3 illustrates a frame structure proposed to identify a signal reception quality value in an uplink interference-free environment according to the present disclosure.

Specifically, the BS device 100 according to the present disclosure allocates FD radio resources that simultaneously use the same frequency/time resources for transmission and reception to each of the terminals 10 and 20, as illustrated in FIG. 3.

Accordingly, each of the terminals 10 and 20 connected to the BS device 100 may measure the signal reception quality value (for example, SINR) based on the downlink signal from the BS device 100 in the FD radio resources having uplink interference, that is, additional interference due to FD caused by same-cell terminals and different-cell terminals, and report the measured signal reception quality value to the BS device 100.

Hereinafter, for convenience of description, the signal reception quality value (for example, SINR) measured and reported for each of the terminals 10 and 20 in the FD radio resources will be referred to as an SINR in the FD transmission environment.

Accordingly, the interference identification unit 110 may receive the report on the SINR in the FD transmission environment measured for each of the terminals 10 and 20 in the FD radio resources and collect the SINR.

Then, the interference identification unit 110 may identify uplink interference, that is, additional interference due to FD for each of the terminals 10 and 20 based on the SINR in the FD transmission environment and the SINR (b) in the uplink interference-free environment.

For example, the interference identification unit 110 may identify a value (c) as uplink interference, that is, additional interference due to FD that each terminal 10 or 20 additionally experiences due to FD, where the value (c) is generated by subtracting the SINR (b) in the uplink interference-free environment identified for each of the terminals 10 and 20 from the SINR in the FD transmission environment collected for each of the terminals 10 and 20.

That is, the interference identification unit 110 identifies only the uplink interference, that is, the additional interference due to FD additionally caused by same-cell terminals and different-cell terminals due to FD for each terminal 10 or 20 without consideration of interference by other factors.

Then, the terminal identification unit 120 identifies, as a particular terminal, a terminal experiencing identified uplink interference (c), that is, additional interference (c) due to FD higher than or equal to a preset threshold value (a) between the terminals 10 and 20.

As described above, according to an embodiment for identifying the particular terminal, the BS device 100 leads the process of identifying the particular terminal having additional interference due to FD higher than or equal to the threshold value.

Meanwhile, according to another embodiment for identifying the particular terminal, the BS device 100 according to the present disclosure does not need to include the interference identification unit 110 nor the signal reception quality value identification unit 130.

Hereinafter, another embodiment in which the BS device 100 according to the present disclosure does not include the interference identification unit 110 nor the signal reception quality value identification unit 130 will be described.

In this case, when there is a terminal reporting self-determination information, which determines to have uplink interference due to FD higher than or equal to the threshold value (a), between the terminals 10 and 20 connected to the BS device 100 and using FD, the terminal identification unit 120 identifies the terminal reporting the self-determination information as the particular terminal.

According to another embodiment of identifying the particular terminal, the BS device 100 informs each of the terminals 10 and 20 of the identification period (T) and the threshold value (a), so as to allow each of the terminals 10 and 20 to measure the SINR (b) in the uplink interference-free environment described below at every identification period (T) and to determine whether its own uplink interference is higher than or equal to the threshold value (a).

Accordingly, as in the first embodiment and the second embodiment, each of the terminals 10 and 20 connected to the BS device 100 may measure the signal reception quality value, that is, the SINR (b) in the uplink interference-free environment based on the downlink signal from the BS device 100 in some radio resources where there is no uplink interference, that is, additional interference due to FD caused by same-cell terminals and different-cell terminals since there is no uplink signal when the FD is used.

As described above, at every identification period (T), each of the terminals 10 and 20 may periodically measure the SINR (b) in the uplink interference-free environment in some radio resources having no additional interference due to FD among the FD radio resources.

Further, each of the terminals 10 and 20 measures the SINR in the FD transmission environment in the FD radio resources.

That is, each of the terminals 10 and 20 may measure the signal reception quality value, that is, the SINR in the FD transmission environment based on the downlink signal from the BS device 100 in the FD radio resources where there is uplink interference, that is, additional interference due to FD caused by same-cell terminals and different-cell terminals.

Then, each of the terminals 10 and 20 may identify the uplink interference, that is, the additional interference due to FD based on the SINR (b) in the uplink interference-free environment and the SINR in the FD transmission environment measured by itself.

In the description for the terminal 20, the terminal 20 may identify a value (c) calculated by subtracting the SINR (b) in the uplink interference-free environment from the SINR in the FD transmission environment measured by the terminal 20 itself as uplink interference, that is, additional interference due to FD that the terminal 20 itself additionally experiences due to the FD.

Further, each of the terminals 10 and 20 determines whether the identified uplink interference (c), that is, the additional interference (c) due to FD, is higher than or equal to the threshold value (a), and when it is determined that the additional interference (c) due to FD is higher than or equal to the threshold value (a), reports the self-determination information to the BS device 100.

For example, when it is determined that the uplink interference (c), that is, the additional interference (c) due to FD, identified by the terminal 20, is higher than or equal to the threshold value (a), the terminal 20 reports the self-determination information to the BS device 100.

When the terminal 20 between the terminals 10 and 20 reports the self-determination information as described above, the terminal identification unit 120 may identify the terminal 20 that reported the self-determination information as the particular terminal.

As described above, according to another embodiment of identifying the particular terminal, the respective terminals lead the process of identifying the particular terminal having additional interference due to FD higher than or equal to the threshold value.

Hereinafter, for convenience of description, the terminal 20 is described as the particular terminal based on the assumption that the uplink interference (c) of the terminal 20 is higher than or equal to the threshold value (a).

The selection unit 140 selects an interfering terminal that causes uplink interference in the particular terminal, for example, the terminal 20.

Here, the interfering terminal may be a terminal selected according to a distance from the particular terminal (for example, the terminal 20) among terminals connected to the BS device 100 or a neighboring BS adjacent to the BS device 100.

For example, based on an uplink signal measurement strength from other terminal measured by the particular terminal, that is, the terminal 20, it may be considered that the terminal having the largest measurement strength is closest to the terminal 20 and that the terminal having the smallest measurement strength is farthest from the terminal 20 among terminals located within a range that may cause uplink interference in the terminal 20, that is, terminals connected to the BS device 100 or the neighboring BS adjacent to the BS device 100.

Then, the selection unit 140 may compare uplink signal measurement strengths from other terminals measured by the particular terminal, that is, the terminal 20, and select the terminal having the largest measurement strength as an interfering terminal, which causes uplink interference in the terminal 20 or select N terminals, which are sequentially selected from the terminal having the largest measurement strength, as interfering terminals among the terminals connected to the BS device 100 or the neighboring BS (the BS 2 of FIG. 2) adjacent to the BS device 100.

Alternatively, based on the uplink signal measurement strengths from other terminals measured by the particular terminal, that is, the terminal 20, the selection unit 140 may select a terminal having a measurement strength larger than or equal to a preset interfering terminal selection value as the interfering terminal that causes uplink interference in the terminal 20, among the terminals connected to the BS device 100 or the neighboring BS (the BS 2 of FIG. 2) adjacent to the BS device 100.

Hereinafter, the following description will be made based on the assumption that the selection unit 140 selects the terminals 10 and 30 illustrated in FIG. 1 as the interfering terminals that cause uplink interference in the terminal 20.

The controller 150 controls FD radio resource allocated to the interfering terminals, that is, the terminals 10 and 30, to reduce uplink interference influencing the particular terminal, that is, the terminal 20.

Specifically, the controller 150 may down-control uplink transmission strengths of the terminals 10 and 30 or blanking-control the uplink of the terminals 10 and 30 in the FD radio resources allocated to the interfering terminals, that is, the terminals 10 and 30.

At this time, with respect to the terminal 10, which is the same-cell terminal connected to the BS device 100, between the interfering terminals, that is, the terminals 10 and 30, the controller 150 may directly control the FD radio resources allocated to the terminal 10 to reduce uplink interference influencing the terminal 20.

Meanwhile, with respect to the terminal 30, which is the different-cell terminal connected to the other BS 2, between the interfering terminals, that is, the terminals 10 and 30, the controller 150 may indirectly control the FD radio resources allocated to the terminal 30 to reduce uplink interference influencing the terminal 20 through interworking with the BS 2.

Hereinafter, a process of controlling the FD radio resources allocated to the interfering terminals will be described in detail based on the terminal 10.

The controller 150 first identifies information on the FD radio resources allocated to the interfering terminal, that is, the terminal 10. For example, information on the FD radio resources may be a resource allocation location, and uplink transmission strength of the terminal 10.

Figure 4:
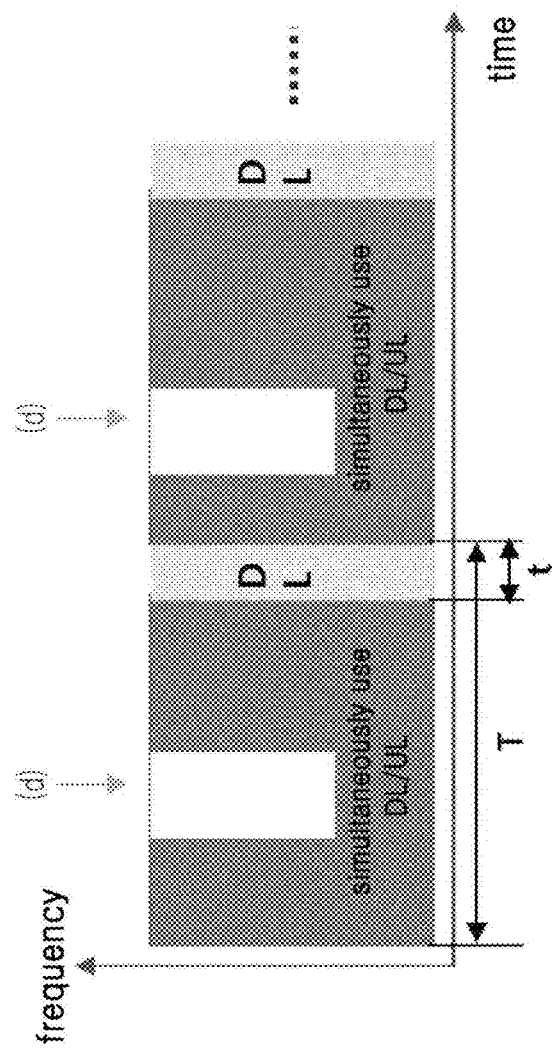
FIG. 4 illustrates an example for controlling FD transmission radio resources allocated to an interfering terminal according to the present disclosure.

As illustrated in FIG. 4, it is assumed that the controller 150 identifies a resource allocation location (d) of the FD radio resources allocated to the interfering terminal, that is, the terminal 10.

The controller 150 may down-control the uplink transmission strength of the terminal 10 by a preset unit of strength in the FD radio resources (d) allocated to the terminal 10.

According to an embodiment, the controller 150 may down-control the uplink transmission strength once by a unit of strength in the FD radio resources (d) allocated to the terminal 10.

Of course, the controller 150 may also down-control the uplink transmission strength of the terminal 30 once by the unit of strength in the FD radio resources allocated to the terminal 30 through interworking with the BS 2.

According to another example, the controller 150 may down-control the uplink transmission strength of the terminal 10 several times by the unit of strength until the uplink transmission strength of the terminal 10 is equal to or lower than a predefined minimum transmission strength.

Of course, the controller 150 may also down-control the uplink transmission strength of the terminal 30 several times by the unit of strength through interworking with the BS 2 within the minimum transmission strength limit.

At this time, after down-controlling the uplink transmission strengths of the interfering terminals 10 and 30, the controller 150 identifies whether re-identified uplink interference of the terminal 20 is higher than or equal to the threshold value (a).

That is, the controller 150 may down-control the uplink transmission strengths of the interfering terminals 10 and 30 by the unit of strength several times within the minimum transmission strength limit by down-controlling the uplink transmission strengths of the interfering terminals 10 and 30 once again when the uplink interference of the terminal 20 is higher than or equal to the threshold value (a) and stopping down-controlling the uplink transmission strengths of the interfering terminals 10 and 30 when the uplink interference of the terminal 20 is not higher than or equal to the threshold value (a) based on a result of the re-identification.

Meanwhile, the controller 150 may blanking-control the uplink of the terminal 10 in the FD radio resources (d) allocated to the terminal 10.

According to an example, the controller 150 may immediately blanking-control the uplink of the terminal 10 in the FD radio resources (d) allocated to the terminal 10.

Of course, the controller 150 may also immediately blanking-control the uplink of the terminal 30 in the FD radio resources allocated to the terminal 30 through interworking with the BS 2.

According to another example, the controller 150 may down-control the uplink transmission strength of the terminal 10 in the FD radio resources (d) allocated to the terminal 10 and down-control the uplink transmission strength of the terminal 30 in the FD radio resources allocated to the terminal 30 through interworking with the BS 2. Then, when the uplink interference of the terminal 20 is still higher than or equal to the threshold value (a) even after the down-control of the uplink transmission strengths of the interfering terminals 10 and 30, the controller 150 may blanking-control the uplink of the terminals 10 and 30.

According to another example, when there is an interfering terminal (for example, the terminal 10), which cannot be down-controlled due to the minimum transmission strength limit during a process of down-controlling the uplink transmission strengths of the interfering terminals 10 and 30 by the unit of strength several times within the minimum transmission strength limit as described in the above example, the controller 150 may blanking-control the uplink of the corresponding interfering terminal (for example, the terminal 10).

As described above, if the FD radio resources of the interfering terminals 10 and 30, which give additional interference due to FD to the terminal 20, are controlled, the interfering terminals 10 and 30 may somewhat suffer from the loss of uplink resources, but this results in reduction in the additional interference due to FD influencing the terminal 20, that is, reduction in uplink interference from same-cell terminals and different-cell terminals.

As described above, when FD transmission is used in an actual mobile communication environment including a plurality of terminals, the BS device according to the present disclosure may resolve additional interference generated due to FD, that is, uplink interference (hereinafter, referred to as additional interference due to FD) caused by same-cell terminals and different-cell terminals, which accordingly has an effect of maximally taking advantage of the increase in FD transmission capacity.

Figure 5:
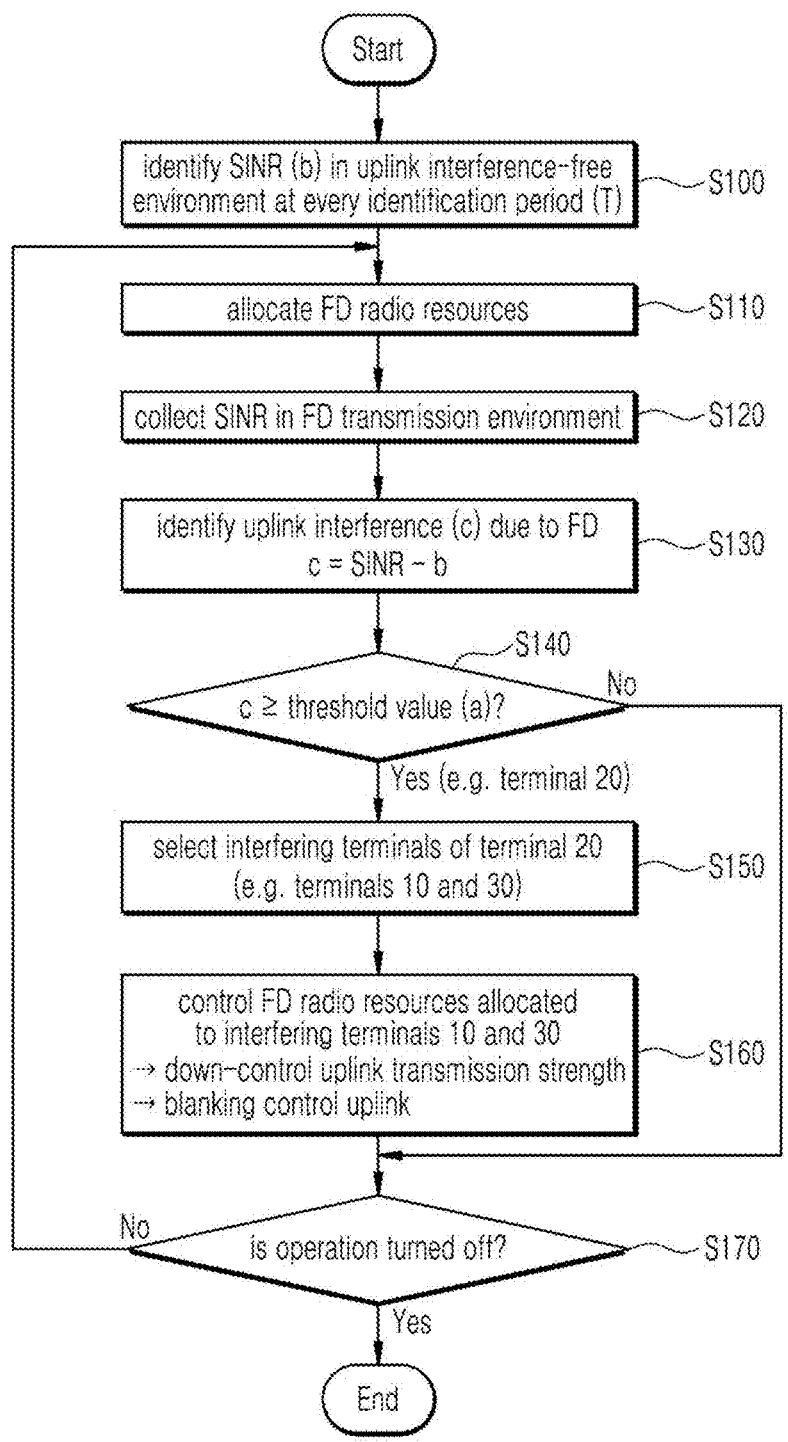
FIGS. 5 and 6 are control flowcharts illustrating a method of controlling FD transmission according to an embodiment of the present disclosure.
Figure 6:
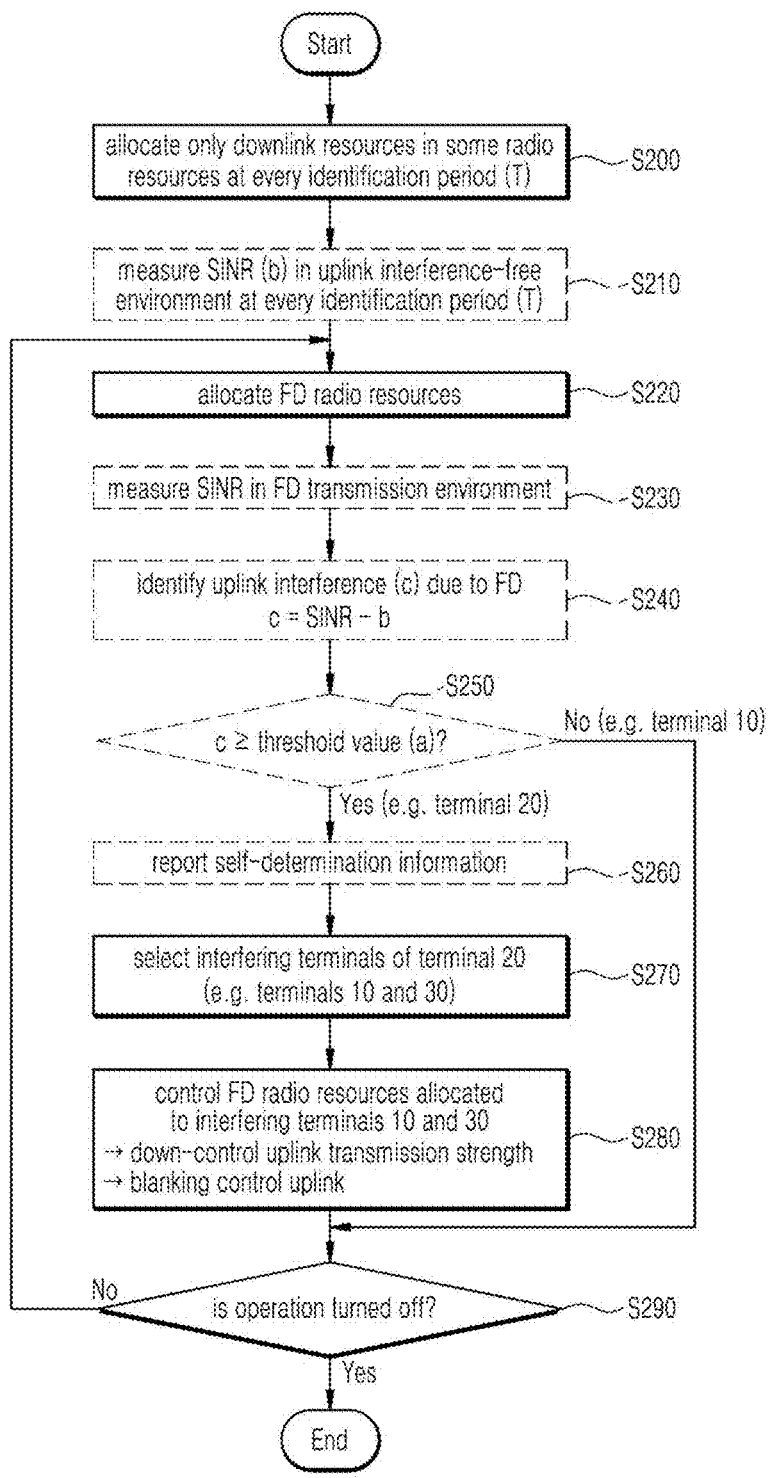

Hereinafter, the method of controlling FD transmission according to an embodiment of the present disclosure will be described with reference to FIGS. 5 and 6.

For convenience of description, as in the above embodiment, the BS device 100 (the BS 1 of FIG. 1) will be described and the reference numerals of FIGS. 1 to 4 will be used.

First, the method of controlling FD transmission according to an embodiment of the present disclosure is described with reference to FIG. 5.

According to the method of controlling FD transmission according to an embodiment of the present disclosure, at every preset period (T), the BS device 100 identifies the SINR (b) in the uplink interference-free environment measured for each terminal in some radio resources for transmitting only the downlink signal among FD transmission radio resources in S100.

A detailed description thereof will be made with reference to FIG. 3. The BS device 100 according to the present disclosure may allocate only downlink resources without allocating uplink resources in the channel bandwidth of the FD radio resources for a predetermined time (t) at every preset identification period (T) among the FD transmission radio resources (hereinafter, referred to as FD radio resources) having the same frequency/time resources simultaneously used for transmission and reception, as illustrated in a first embodiment of FIG. 3.

Here, the channel bandwidth of the FD radio resources in which only the downlink resources are allocated at every preset identification period (T) corresponds to some radio resources for transmitting only the downlink signal among the FD radio resources.

Meanwhile, as in the second embodiment illustrated in FIG. 3, the BS device 100 according to the present disclosure may divides the channel bandwidth of the FD radio resources into a plurality of sub-carriers having certain intervals for a predetermined time (t) at every preset identification period (T), and may allocate only downlink resources without allocating uplink resources in some (for example, N) of the plurality of sub-carriers separating the channel bandwidth.

Here, some (for example, N) sub-carriers of the channel bandwidth of the FD radio resources in which only the downlink resources are allocated at every preset identification period (T) correspond to some radio resources for transmitting only the downlink signal among the FD radio resources.

In the case of the first embodiment and the second embodiment, each of the terminals 10 and 20 connected to the BS device 100 may measure a signal reception quality value (for example, SINR) based on a downlink signal from the BS device 100 in some radio resources in which there is no uplink interference, that is, additional interference, due to FD caused by same-cell terminals and different-cell terminals since there is no uplink signal while FD is used. Then each of the terminals 10 and 20 may report the measured signal reception quality value to the BS device 100.

Hereinafter, for convenience of description, the signal reception quality value (for example, SINR) measured and reported according to each of the terminals 10 and 20 in some radio resources in which there is no additional interference due to FD among the FD radio resources will be referred to as an SINR (b) in the uplink interference-free environment.

Accordingly, the BS device 100 may periodically identify the SINR (b) in the uplink interference-free environment for each of the terminals 10 and 20 by receiving the report on the SINR (b) in the uplink interference-free environment, measured for each of the terminals 10 and 20 in some radio resources in which there is no additional interference due to FD among the FD radio resources at every identification period (T).

Further, although not separately described, the BS device 100 may periodically repeat step S100 of identifying the SINR (b) in the uplink interference-free environment according to each of the terminals 10 and 20 at every identification period (T).

In addition, the BS device 100 collects the signal reception quality value in the FD transmission environment measured according to each of the terminals 10 and 20 in FD radio resources.

Specifically, the BS device 100 according to the present disclosure allocates FD resources that simultaneously use the same frequency/time resources for transmission and reception to each terminal 10 and 20, as illustrated in FIG. 3 in S110.

Accordingly, each of the terminals 10 and 20 connected to the BS device 100 may measure the signal reception quality value (for example, SINR) based on the downlink signal from the BS device 100 in the FD radio resources having uplink interference, that is, additional interference due to FD caused by same-cell terminals and different-cell terminals, and reports the measured signal reception quality value to the BS device 100.

Hereinafter, for convenience of description, the signal reception quality value (for example, SINR), measured and reported for each of the terminals 10 and 20 in the FD radio resources, will be referred to as an SINR in the FD transmission environment.

Accordingly, the BS device 100 may collect the SINR by receiving the report on the SINR in the FD transmission environment measured for each of the terminals 10 and 20 in the FD radio resources in S120.

Then, the BS device 100 may identify uplink interference, that is, additional interference due to FD based on the SINR in the FD transmission environment and the SINR (b) in the uplink interference-free environment for each of the terminals 10 and 20 in S130.

For example, the BS device 100 may identify a value (c) as uplink interference, that is, additional interference due to FD that each terminal 10 or 20 additionally experiences due to FD, where the value (c) is generated by subtracting the SINR (b) in the uplink interference-free environment identified for each of the terminals 10 and 20 from the SINR in the FD transmission environment collected for each of the terminals 10 and 20.

The BS device 100 identifies whether there is a particular terminal experiencing identified uplink interference (c), that is, additional interference (c) due to FD higher than or equal to a preset threshold value (a) between the terminals 10 and 20 in S140.

When there is no particular terminal having the additional interference (c) due to FD higher than or equal to the threshold value (a) between the terminals 10 and 20 (No in S140), the BS 100 may repeat steps after step S110 based on the periodically identified SINR (b) in the uplink interference-free environment for each terminal as long as the operation of the BS device 100 is not turned off (No in S170).

Hereinafter, for convenience of description, the terminal 20 is described as the particular terminal based on an assumption that the uplink interference (c) of the terminal 20 is higher than or equal to the threshold value (a) (Yes in S140).

The BS device 100 selects an interfering terminal that causes uplink interference in the particular terminal, for example, the terminal 20 in S150.

For example, the BS device 100 may compare uplink signal measurement strengths from other terminals measured by the particular terminal, that is, the terminal 20, and select the terminal having the largest measurement strength as an interfering terminal, which causes uplink interference in the terminal 20, or select N terminals, which are sequentially selected from the terminal having the largest measurement strength, as interfering terminals among terminals connected to the BS device 100 or a neighboring BS (the BS 2 of FIG. 2) adjacent to the BS device 100.

Alternatively, based on the uplink signal measurement strengths from other terminals measured by the particular terminal, that is, the terminal 20, the BS device 100 may select a terminal having a measurement strength larger than or equal to a preset interfering terminal selection value as the interfering terminal, which causes uplink interference in the terminal 20, among the terminals connected to the BS device 100 or the neighboring BS (the BS 2 of FIG. 2) adjacent to the BS device 100.

Hereinafter, the following description will be made based on an assumption that the terminals 10 and 30 illustrated in FIG. 1 are selected as interfering terminals that cause uplink interference in the terminal 20 in step S150.

The BS device 100 controls FD radio resources allocated to the interfering terminals, that is, the terminals 10 and 30, to reduce the uplink interference influencing the particular terminal, that is, the terminal 20 in S160.

Specifically, the BS device 100 may down-control uplink transmission strengths of the terminals 10 and 30 or blanking-control the uplink of the terminals 10 and 30 in the FD radio resources allocated to the interfering terminals, that is, the terminals 10 and 30.

At this time, with respect to the terminal 10, which is a same-cell terminal connected to the BS device 100, between the interfering terminals, that is, the terminals 10 and 30, the BS device 100 may directly control the FD radio resources allocated to the terminal 10 to reduce the uplink interference influencing the terminal 20.

Meanwhile, with respect to the terminal 30, which is a different-cell terminal connected to the other BS 2, between the interfering terminals, that is, the terminals 10 and 30, the BS device 100 may indirectly control the FD radio resources allocated to the terminal 30 to reduce the uplink interference influencing the terminal 20 through interworking with the BS 2.

Hereinafter, a process of controlling the FD radio resources allocated to the interfering terminals will be described in detail based on the terminal 10.

The BS device 100 first identifies information on FD radio resources allocated to the interfering terminal, that is, the terminal 10, for example, a resource allocation location, and the uplink transmission strength of the terminal 10.

It is assumed that the controller 150 identifies a resource allocation location (d) of the FD radio resources allocated to the interfering terminal, that is, the terminal 10 as illustrated in FIG. 4.

The BS device 100 may down-control the uplink transmission strength of the terminal by a preset unit of strength in the FD radio resources (d) allocated to the terminal 10.

According to an example, the BS device 100 may down-control the uplink transmission strength of the terminal 10 by the unit of strength once in the FD radio resources (d) allocated to the terminal 10.

Of course, through interworking with the BS 2, the BS device 100 may also down-control the uplink transmission strength of the terminal 30 by the unit of strength once in the FD radio resources (d) allocated to the terminal 30.

According to another embodiment, the BS device 100 may down-control the uplink transmission strength of the terminal 10 by the unit of strength several times until the uplink transmission strength of the terminal 10 is equal to or lower than a predetermined minimum transmission strength.

Of course, the BS 100 may also down-control the uplink transmission strength of the terminal 30 by the unit of strength several times within the minimum transmission strength limit through interworking with the BS 2.

At this time, after down-controlling the uplink transmission strengths of the interfering terminals 10 and 30, the BS device 100 identifies whether re-identified uplink interference of the terminal 20 is higher than or equal to the threshold value (a).

That is, the BS device 100 may down-control the uplink transmission strengths of the interfering terminals 10 and 30 by the unit of strength several times while remaining above the minimum transmission strength limit by down-controlling the uplink transmission strengths of the interfering terminals 10 and 30 again when the uplink interference of the terminal 20 is higher than or equal to the threshold value (a) and stopping down-controlling the uplink transmission strengths of the interfering terminals 10 and 30 when the uplink interference of the terminal 20 is not higher than or equal to the threshold value (a) based on a result of the re-identification.

Meanwhile, the BS device 100 may blanking-control the uplink of the terminal 10 in the FD radio resources (d) allocated to the terminal 10.

According to an example, the BS device 100 may immediately blanking-control the uplink of the terminal 10 in the FD radio resources (d) allocated to the terminal 10.

Of course, the BS device 100 may also immediately blanking-control the uplink of the terminal 30 in the FD radio resources allocated to the terminal 30 through interworking with the BS 2.

According to another example, the BS device 100 may down-control the uplink transmission strength of the terminal 10 in the FD radio resources (d) allocated to the terminal 10 and may down-control the uplink transmission strength of the terminal 30 in the FD radio resources allocated to the terminal 30 through interworking with the BS 2. Then, when the uplink interference of the terminal 20 is still higher than or equal to the threshold value (a), even after the down-control of the uplink transmission strengths of the interfering terminals 10 and 30, the controller 150 may blanking-control the uplink of the terminals 10 and 30.

According to another example, when there is an interfering terminal (for example, the terminal 10) that cannot be down-controlled due to the minimum transmission strength limit during a process of down-controlling the uplink transmission strengths of the interfering terminals 10 and 30 by the unit of strength several times within the minimum transmission strength limit, as described in the above example, the BS device 100 may blanking-control the uplink of the corresponding interfering terminal (for example, the terminal 10).

As described above, if the FD radio resources of the interfering terminals 10 and 20, which give additional interference due to FD to the terminal 20, are controlled, the interfering terminals 10 and 20 may somewhat suffer from the loss of uplink resources, but this results in a reduction in the additional interference due to FD influencing the terminal 20, that is, reduction in uplink interference from same-cell terminals and different-cell terminals.

After controlling the FD radio resources of the interfering terminals as described above in S160, the BS device 100 repeats steps after step S110 based on the periodically identified SINR (b) in the uplink interference-free environment for each terminal as long as the operation of the BS device 100 is not turned off (No in S170).

Meanwhile, the method of controlling FD transmission according to another embodiment of the present disclosure will be described with reference to FIG. 6. Further, for convenience of description, the operation performed by the BS is marked by straight lines and the operation performed by the terminal is marked by dotted lines.

According to the method of controlling FD transmission according to another embodiment of the present disclosure, as in the embodiment described with reference to FIG. 5 and the first embodiment or the second embodiment of FIG. 3, the BS device 100 allocates only downlink resources without allocating uplink resources in the channel bandwidth of FD radio resources for a predetermined time (t) at every preset identification period (T) among FD transmission radio resources (hereinafter, referred to as FD radio resources) in S200.

At every identification period (T), each of the terminals 10 and 20 connected to the BS device 100 may measure the SINR (b) in the uplink interference-free environment generated by measuring the downlink signal of the BS device 100 in some radio resources having no additional interference due to FD among the FD radio resources in S210.

Further, although not separately described, the BS device 100 periodically repeats step S200 at every identification period (T), and accordingly, the terminal connected to the BS device 100 also periodically repeats step S210 at every identification period (T), although this is not separately described.

Like in the embodiment described with reference to FIG. 5, the BS device 100 allocates FD radio resources that simultaneously use the same frequency/time resources for transmission and reception as illustrated in FIG. 3 to each terminal 10 or 20 in S220.

Then, each of the terminals 10 and 20 connected to the BS device 100 may measure a signal reception quality value, that is, an SINR in the FD transmission environment generated by measuring the downlink signal of the BS device 100 in the FD radio resources having additional interference due to FD in S230.

Then, each of the terminals 10 and 20 may identify the uplink interference, that is, the additional interference due to FD, based on the SINR in the FD transmission environment measured by itself and the SINR (b) in the uplink interference-free environment in S240.

In the description based on the terminal 20, the terminal 20 may identify a value (c) generated by subtracting the SINR (b) in the uplink interference-free environment from the SINR in the FD transmission environment measured by the terminal 20 itself as uplink interference, that is, additional interference due to FD that the terminal 20 itself additionally receives due to the FD.

Further, each of the terminals 10 and 20 determines whether the identified uplink interference (c), that is, the additional interference (c) due to FD, is higher than or equal to the threshold value (a) in S250, and when it is determined that the additional interference (c) due to FD is higher than or equal to the threshold value (a), reports the self-determination information to the BS device 100 in S260.

Hereinafter, for convenience of the description, it is assumed that the terminal 10 determines that the additional interference (c) due to FD is not larger than or equal to the threshold value (a) (No in S250), and that the terminal 20 determines that the additional interference (c) due to FD is larger than or equal to the threshold value (a) (Yes in S250) and reports self-determination information to the BS device 100.

In this case, when the terminal 20 between the terminals 10 and 20 reports the self-determination information as described above, the BS device 100 may identify the terminal 20 that reported the self-determination information as a particular terminal.

The BS device 100 selects an interfering terminal that causes uplink interference in the identified particular terminal, for example, the terminal 20 in S270.

At this time, since step S270 is the same as the embodiment described with reference to FIG. 5, a detailed description thereof will be omitted, and hereinafter it will be assumed that the terminals 10 and 30 are selected as interfering terminals that cause uplink interference in the terminal 20.

The BS device 100 controls FD radio resources allocated to the interfering terminals, that is, the terminals 10 and 30, to reduce the uplink interference influencing the particular terminal, that is, the terminal 20, in S280.

Specifically, the BS device 100 may down-control uplink transmission strengths of the terminals 10 and 30 or blanking-control the uplink of the terminals 10 and 30 in the FD radio resources allocated to the interfering terminals, that is, the terminals 10 and 30.

At this time, with respect to the terminal 10, which is a same-cell terminal connected to the BS device 100 between the interfering terminals, that is, the terminals 10 and 30, the BS device 100 may directly control the FD radio resources allocated to the terminal 10 to reduce the uplink interference influencing the terminal 20.

Meanwhile, with respect to the terminal 30, which is a different-cell terminal connected to the other BS 2, between the interfering terminals, that is, the terminals 10 and 30, the BS device 100 may indirectly control the FD radio resources allocated to the terminal 30 to reduce the uplink interference influencing the terminal 20 through interworking with the BS 2.

Hereinafter, a process of controlling the FD radio resources allocated to the interfering terminals will be described in detail based on the terminal 10.

The BS device 100 first identifies information on FD radio resources allocated to the interfering terminal, that is, the terminal 10, for example, a resource allocation location and the uplink transmission strength of the terminal 10.

It is assumed that the controller 150 identifies a resource allocation location (d) of the FD radio resources allocated to the interfering terminal, that is, the terminal 10, as illustrated in FIG. 4.

The BS device 100 may down-control the uplink transmission strength of the terminal 10 by a preset unit of strength in the FD radio resources (d) allocated to the terminal 10.

According to an example, the BS device 100 may down-control the uplink transmission strength of the terminal 10 by the unit of strength once in the FD radio resources (d) allocated to the terminal 10.

Of course, through interworking with the BS 2, the BS device 100 may also down-control the uplink transmission strength of the terminal 30 by the unit of strength once in the FD radio resources (d) allocated to the terminal 30.

According to another embodiment, the BS device 100 may down-control the uplink transmission strength of the terminal 10 by the unit of strength several times until the uplink transmission strength of the terminal 10 is equal to or lower than a predetermined minimum transmission strength.

Of course, the BS 100 may also down-control the uplink transmission strength of the terminal 30 by the unit of strength several times within the minimum transmission strength limit through interworking with the BS 2.

At this time, after down-controlling the uplink transmission strengths of the interfering terminals 10 and 30, the BS device 100 identifies whether the re-identified uplink interference of the terminal 20 is higher than or equal to the threshold value (a).

That is, the BS device 100 may down-control the uplink transmission strengths of the interfering terminals 10 and 30 by the unit of strength several times within the minimum transmission strength limit by down-controlling the uplink transmission strengths of the interfering terminals 10 and 30 again when the uplink interference of the terminal 20 is higher than or equal to the threshold value (a) and stopping down-controlling the uplink transmission strengths of the interfering terminals 10 and 30 when the uplink interference of the terminal 20 is not higher than or equal to the threshold value (a) based on a result of the re-identification.

Meanwhile, the BS device 100 may blanking-control the uplink of the terminal 10 in the FD radio resources (d) allocated to the terminal 10.

According to an example, the BS device 100 may immediately blanking-control the uplink of the terminal 10 in the FD radio resources (d) allocated to the terminal 10.

Of course, the BS device 100 may also immediately blanking-control the uplink of the terminal 30 in the FD radio resources allocated to the terminal 30 through interworking with the BS 2.

According to another example, the BS device 100 may down-control the uplink transmission strength of the terminal 10 in the FD radio resources (d) allocated to the terminal 10 and may down-control the uplink transmission strength of the terminal 30 in the FD radio resources allocated to the terminal 30 through interworking with the BS 2. Then, when the uplink interference of the terminal 20 is still higher than or equal to the threshold value (a) even after the down-control of the uplink transmission strengths of the interfering terminals 10 and 30, the controller 150 may blanking-control the uplink of the terminals 10 and 30.

According to another example, when there is an interfering terminal (for example, the terminal 10), which cannot be down-controlled due to the minimum transmission strength limit during a process of down-controlling the uplink transmission strengths of the interfering terminals 10 and 30 by the unit of strength several times within the minimum transmission strength limit, as described in the above example, the BS device 100 may blanking-control the uplink of the corresponding interfering terminal (for example, the terminal 10).

As described above, if the FD radio resources of the interfering terminals 10 and 20, which give additional interference due to FD to the terminal 20, are controlled, the interfering terminals 10 and 20 may somewhat suffer from the loss of uplink resources, but this results in a reduction in additional interference due to FD influencing the terminal 20, that is, a reduction in uplink interference from both same-cell terminals and different-cell terminals.

After controlling the FD radio resources of the interfering terminals as described above in S280, the BS device 100 repeats steps after step S220 so that each terminal can determine whether its uplink interference, that is, additional interference due to FD, is larger than or equal to the threshold value (a) as long as the operation of the BS device 100 is not turned off (No in S290).

As described above, when FD transmission is used in an actual mobile communication environment including a plurality of terminals, the method of controlling FD transmission according to the present disclosure may create an effect of resolving additional interference generated due to FD, that is, uplink interference (hereinafter, referred to as additional interference due to FD) that the terminal receives from same-cell terminals and different-cell terminals.

The method of controlling FD transmission according to an embodiment of the present disclosure may be implemented in the form of program instructions that can be performed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A base station (BS) device comprising:
   a signal reception quality value identification unit configured to identify, at every preset identification period, a signal reception quality value in an uplink interference-free environment measured for each terminal in a part of radio resource of full duplex (FD) transmission radio resources for transmitting only downlink signals;
   a terminal identification unit configured to identify a particular terminal experiencing uplink interference due to full duplex (FD) transmission among terminals using the FD transmission when a value of the uplink interference caused to the particular terminal is larger than or equal to a preset threshold value, wherein the particular terminal is identified based on the signal reception quality value measured at every preset identification period and the uplink interference;
   a selection unit configured to select an interfering terminal that causes the uplink interference to the particular terminal; and
   a controller configured to control the FD transmission radio resources allocated to the interfering terminal to reduce the uplink interference to the particular terminal caused by the interfering terminal.

2. The BS device of claim 1, further comprising
   an interference identification unit configured to identify the uplink interference due to the FD transmission for each terminal, wherein the terminal identification unit identifies, among the terminals, a terminal experiencing the identified uplink interference larger than or equal to the threshold value as the particular terminal.

3. The BS device of claim 1, wherein, when there is a terminal reporting self-determination information, which determines that the uplink interference due to the FD transmission is larger than or equal to the threshold value, among the terminals, the terminal identification unit identifies the terminal reporting the self-determination information as the particular terminal.

4. The BS device of claim 2, wherein the interference identification unit
   collects the signal reception quality value in an FD transmission environment measured for each terminal in the FD transmission radio resources, and
   identifies the uplink interference for each terminal based on the signal reception quality value in the FD transmission environment and the signal reception quality value in the uplink interference-free environment.

5. The BS device of claim 1, wherein the part of radio resources is a part of a channel bandwidth of the FD transmission radio resources for transmitting only downlink signals at every preset identification period or a part of a plurality of sub-carriers that divide the channel bandwidth of the FD transmission radio resources at certain intervals.

6. The BS device of claim 1, wherein the interfering terminal is a terminal selected according to a distance from the particular terminal among terminals connected to the BS device or a neighboring BS adjacent to the BS device.

7. The BS device of claim 1, wherein the controller down-controls an uplink transmission strength of the interfering terminal or blanking-controls uplink of the interfering terminal in FD transmission radio resources allocated to the interfering terminal.

8. The BS device of claim 1, wherein the controller down-controls an uplink transmission strength of the interfering terminal in FD transmission radio resources allocated to the interfering terminal, and when the uplink interference experienced by the particular terminal is larger than or equal to the threshold value after the uplink transmission strength of the interfering terminal is down-controlled, blanking-controls uplink of the interfering terminal.

9. A method performed by a base station (BS) device of controlling full duplex (FD) transmission, the method comprising:
   identifying, at every preset identification period, a signal reception quality value in an uplink interference-free environment measured for each terminal in a part of radio resource of full duplex (FD) transmission radio resources for transmitting only downlink signals;
   identifying a particular terminal experiencing uplink interference due to the FD transmission among terminals using the FD transmission when a value of the uplink interference caused to the particular terminal is larger than or equal to a preset threshold value, wherein the particular terminal is identified based on the signal reception quality value measured at every preset identification period and the uplink interference;
   selecting an interfering terminal that causes the uplink interference to the particular terminal; and
   controlling, by the BS, the FD transmission radio resources allocated to the interfering terminal to reduce the uplink interference which is caused to the particular terminal caused by the interfering terminal.

10. The method of claim 9, further comprising
    identifying the uplink interference experienced by each terminal due to FD transmission, and
    identifying, among the terminals, the terminal experiencing the identified uplink interference larger than or equal to the threshold value as the particular terminal.

11. The method of claim 9, further comprising
    reporting self-determination information to the BS by a terminal that determines that the uplink interference due to the FD transmission is larger than or equal to the threshold value among the terminals, and
    identifying the terminal reporting the self-determination information as the particular terminal among the terminals.

12. The method of claim 9, wherein the identifying the signal reception quality value comprises:
    collecting the signal reception quality value in a FD transmission environment measured for each terminal in the FD transmission radio resources; and
    identifying the uplink interference for each terminal based on the signal reception quality value in the FD transmission environment and the signal reception quality value in the uplink interference-free environment.

13. The method of claim 9, wherein the controlling FD transmission radio resources comprises
down-controlling an uplink transmission strength of the interfering terminal or blanking-controlling uplink of the interfering terminal in FD transmission radio resources allocated to the interfering terminal.

14. The method of claim 9, wherein the controlling FD transmission radio resources comprises down-controlling an uplink transmission strength of the interfering terminal in FD transmission radio resources allocated to the interfering terminal, and when the uplink interference experienced by the particular terminal is larger than or equal to the threshold value after the uplink transmission strength of the interfering terminal is down-controlled, blanking-controlling uplink of the interfering terminal.

15. A method of controlling full duplex (FD) transmission, the method comprising:
identifying, at every preset identification period, a signal reception quality value in an uplink interference-free environment measured for each terminal in a part of radio resource of full duplex (FD) transmission radio resources for transmitting only downlink signals;
identifying uplink interference due to FD transmission by a terminal;
reporting self-determination information to a base station (BS) by the terminal when it is determined that the uplink interference is larger than or equal to a preset threshold, wherein the uplink interference is identified based on the signal reception quality value measured at every preset identification period; and
selecting, by the BS, an interfering terminal that causes the uplink interference to the terminal reporting the self-determination information and controlling FD radio resources allocated to the interfering terminal to reduce the uplink interference experienced by the terminal.

16. A system for controlling full duplex (FD) transmission, the system comprising:
at least one terminal configured to identify, at every preset identification period, a signal reception quality value in an uplink interference-free environment generated by measuring a downlink signal of a base station (BS) in a part of the FD transmission radio resources for transmitting only the downlink signal and a signal reception quality value in an FD transmission environment generated by measuring the downlink signal of the BS in the FD transmission radio resources; and
the BS configured to, when a particular terminal experiencing the uplink interference due to the FD transmission larger than or equal to a preset threshold value is identified among the at least one terminal based on the signal reception quality value in the uplink interference-free environment and the signal reception quality value in the FD transmission environment related to the at least one terminal,
select an interfering terminal that causes the uplink interference in the particular terminal and
control FD transmission radio resources allocated to the interfering terminal to reduce the uplink interference to the particular terminal caused by the interfering terminal.

* * * * *